Jan. 8, 1952  G. E. MARX  2,581,804
MACHINE TOOL DRIVE
Filed Dec. 8, 1950  2 SHEETS—SHEET 2

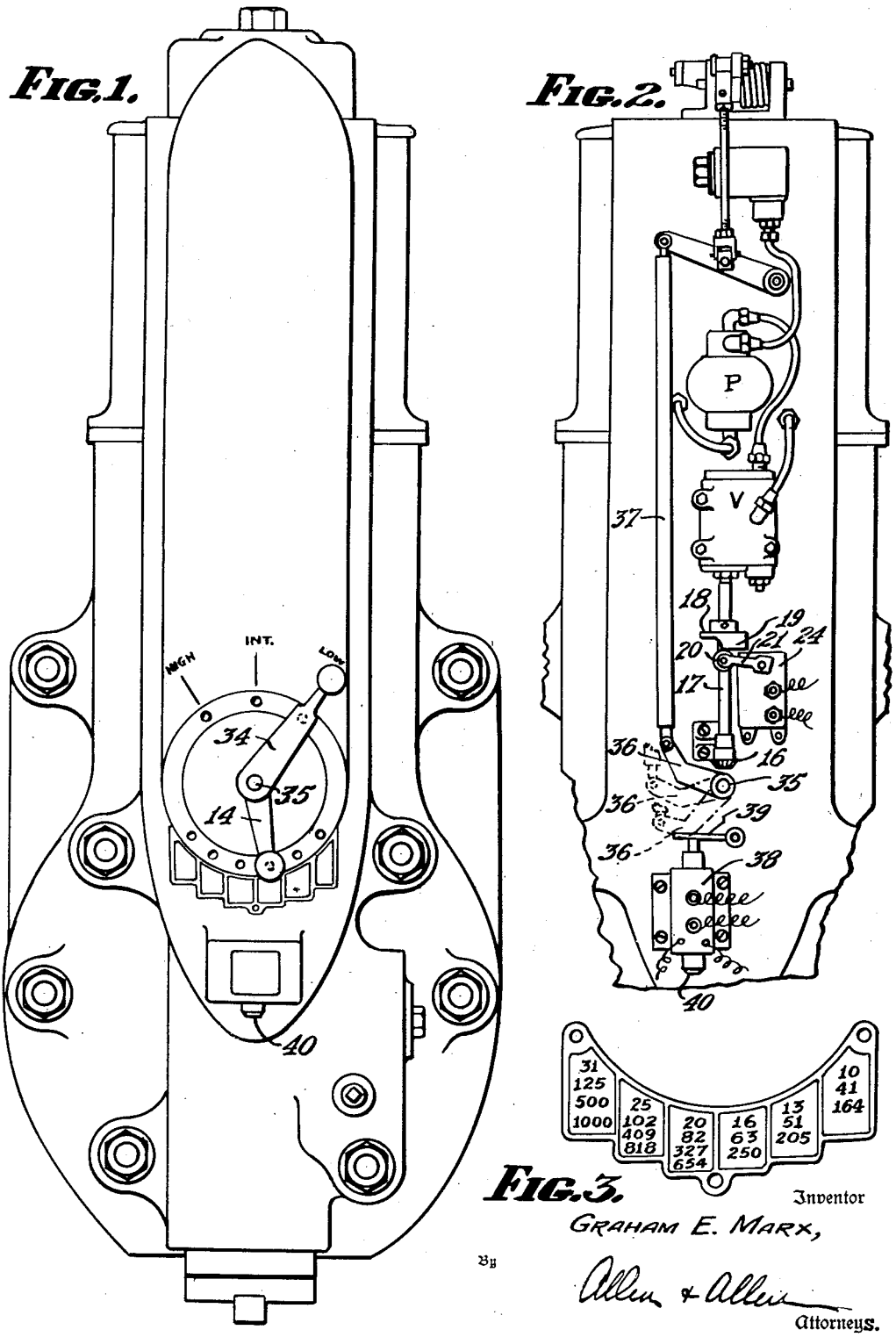

Inventor
GRAHAM E. MARX,
By Allen & Allen
Attorneys.

Patented Jan. 8, 1952

2,581,804

UNITED STATES PATENT OFFICE 2,581,804

MACHINE TOOL DRIVE

Graham E. Marx, Cincinnati, Ohio, assignor to
The G. A. Gray Company, Cincinnati, Ohio, a
corporation of Ohio Application December 8, 1950, Serial No. 199,821

4 Claims. (Cl. 74—472)

This invention relates to speed changing mechanisms for machine tool drives and concerns itself with the possibility of obtaining additional high speeds without sacrificing at the low speed end of the range.

In an earlier patent, No. 2,215,627, in the name of John M. Walter, dated September 24, 1940, and assigned to the assignee of this application, there is disclosed in great detail a machine tool drive. This drive comprised an electric motor capable of operation at two different speeds which motor drove a first speed change transmission capable of three different speed settings. The output of the first speed change transmission constituted the drive of the second speed change transmission which was also capable of setting for three different speed combinations. At the operator's station two operating handles were provided. The first operating handle was operatively connected to a valve which valve was in a hydraulic system by means of which one of the three settings of the first transmission could be selected. The operating handle was capable of occupying six positions so that in sequence it would set the three speeds of which the first transmission was capable, twice in succession. Associated with the operating handle for the first transmission was a mechanism by means of which a switch was thrown substantially at the mid point of the range of movement of the operating handle to cause the speed of the motor to be doubled. In this way as the operating handle was moved through its six positions, three speed combinations were obtained with a first motor speed and then the same three speed transmission combinations with a different motor speed.

A second operating handle was provided for actuating the second speed change transmission, and this lever was capable of three positions in which it would select a low, an intermediate and a high speed for the second speed transmission. In this way a combination of eighteen different speeds was obtained with a motor operating at one or another of two speeds with one operating lever occupying one of six possible positions and the second operating lever occupying one of three different positions.

For a detailed description of the mechanism outlined above reference is made to said earlier patent.

With the increase in cutting speeds encountered in modern machine tool practice it is often desirable to be able to have higher speeds than those of which said earlier device was capable. Such higher speeds could of course be achieved by providing higher speed change combinations or higher motor speed, but any such change would result in a loss of some of the speeds at the low speed end of the range. Many operators desire the additional high speeds without wishing to sacrifice the present low speeds.

The principal object of the present invention therefore resides in the provision of means for obtaining additional high speeds in the device of said earlier patent without sacrificing any speeds presently available at the low speed end of the range. Ancillary objects of the invention involve the provision of such mechanisms which will be relatively simple and relatively foolproof in operation.

These and other objects of the invention which will be set forth in more detail hereinafter or which will be apparent to one skilled in the art upon reading these specifications I accomplish by that certain construction and arrangement of parts of which I shall now describe an exemplary embodiment. Reference is made to the drawings forming a part hereof and in which:

Figure 1 is a front elevation of a machine tool head, more specifically a self contained unit milling head as used on planer type milling machines having my improved speed changing mechanism embodied therein.

Figure 2 is a front elevational view of the upper part of the head with the covers removed.

Figure 3 is an enlarged detailed front elevation of the speed indicating plate.

Figure 4:
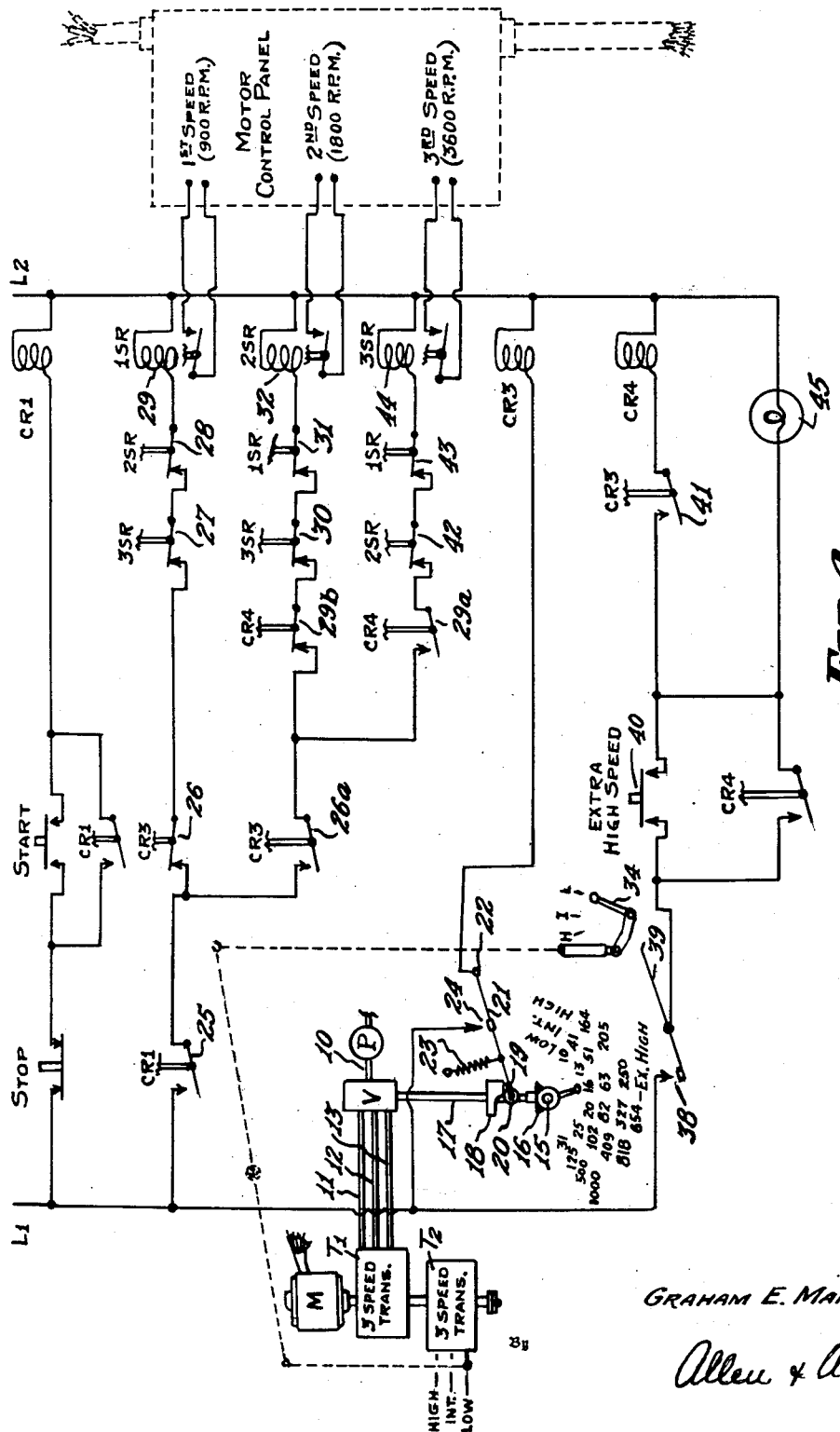
Figure 4 is a simplified wiring diagram tied in with diagrammatic representations of the operating levers and speed transmissions involved.

Briefly, in the practice of my invention I provide a head similar to that disclosed in said earlier patent, and I provide it with similar speed transmission devices and operating handles. Thus, the eighteen lower speeds of which the head is capable are the same as those disclosed in said earlier patent, and they are achieved in the same manner. I provide an additional three speeds at the high speed end of the range by using, instead of a two speed motor, a three speed motor and by providing a switch arranged to be actuated by one of the operating levers in its high speed position which sets up an enabling circuit to permit said motor to operate at its third or highest speed so that when a push button is actuated the motor will operate at its third speed and thus provide additional high speeds.

Referring briefly to the drawings, where only so much of the disclosure of said earlier patent is made as is necessary to an understanding of the present invention, a motor is indicated at M in Figure 4 and is shown diagrammatically as driving into a three speed transmission indicated at $T_1$. The transmission $T_1$ in turn drives into a second three speed transmission indicated at $T_2$. The transmission $T_1$ is hydraulically operated by means of a valve indicated at V to which hydraulic pressure is supplied through a line 10 and from which lines 11, 12 and 13 lead to the speed changing device itself. Thus the valve V can be set to one of three different positions to achieve one of three different speed combinations which may be referred to as A, B, and C, in the transmission device $T_1$.

The valve V is operated by an operating lever indicated in Figure 1 at 14. This lever is capable of assuming one of six different positions. The lever 14 is mounted on a shaft 15 (Figure 4) which through a bevel gear system indicated generally at 16 drives a shaft 17 connected to the valve V. The connection is such that the lever 14 in moving through its entire range from one end to the other rotates the valve V twice so as to admit hydraulic fluid successively to the lines 11, 12, 13 and then again, in turn, 11, 12 and 13, so as to achieve successively the speed combinations, A, B, C, A, B, C.

The motor is arranged to run normally at speeds, which may be say, 900 R. P. M. The shaft 17 carries a cam 18 having a rise 19 occupying one-half of its extent. A roller 20 rides on the cam 18 and actuates a lever 21 pivoted at 22 and biased in an upward direction in Figure 4 by a spring 23. The switch 24 is actuated by the lever 21 and, as will be clear, the switch 24 is closed when the roller 20 is riding on the lower portion of the cam 18 and is open when the roller 20 rises upon the rise 19.

When the switch 24 is open a circuit is established upon actuation of the starting switch indicated at "Start" through the control relay CR1. Actuation of the control relay CR1 actuates the normally open switch 25, the normally closed contact 26 and the normally closed contacts 27 and 28 through the relay 29. The relay 29 is the first speed relay and causes the motor to operate at its first speeds which, for example, may be 900 R. P. M.

As the operating lever 14 is moved to its second position a speed combination B is achieved in the transmission $T_1$ with the motor still running at 900 R. P. M., and when the lever 14 is moved to its third position yet another speed combination C is achieved in the transmission $T_1$ with the motor still running at 900 R. P. M. However, when the lever 14 is moved to its fourth position, re-establishing the first speed combination A, the roller 20 has ridden off the rise 19 of the cam 18 and has closed the switch 24. The closing of the switch 24 establishes the circuit to the control relay 3 indicated at CR3 which causes the contact 26 to open and the contact 26a to close. The closing of the contact 26a establishes a circuit through the normally closed contact 29b, the normally closed contact 30, the normally closed contact 31 to the relay 32 which is the second speed starting relay and causes the motor to operate at its second speed S which may be double the first speed or 1800 R. P. M. Thus, the combination produces in the fourth position of the lever 14 a speed which is double that produced in the first position and similarly the speed in the fifth position is double that in the second position and the speed in the sixth position is double that in the third position.

During all of this time it has been assumed that the transmission $T_2$ has been set in its low position, or combination X, by means of its operating handle 34.

An entire sequence of six new speeds is achieved as before by shifting the lever 34 to its second or intermediate position to give combination Y, and still another sequence of six new speeds is obtained by shifting the lever 34 to its third or high position to give combination Z. According to said earlier patent the connection between the lever 34 and the second transmission $T_2$ is purely mechanical and is indicated diagrammatically in Figure 4. Thus, by a combination in the settings of the two levers 14 and 34 a total of eighteen different speeds can be obtained. Whenever the lever 14 is in one of the first three positions the motor is operating at 900 R. P. M., and whenever it is in one of its second three positions the motor is operating at 1800 R. P. M.

The operating handle 34 is mounted on a shaft 35 to which is keyed a lever 36. The lever 36 connects with a link 37 by means of which motion of the handle member 34 is transmitted to the transmission $T_2$. In accordance with my present invention I associate with the lever 36 a switch indicated at 38 which is actuated by the lever 36 in its lowermost position which it will occupy when the handle member 34 is set at "High." The handle member 36 abuts against a lever 39 and depresses the plunger of the switch 38, in the high position of the lever 34. The switch 38 is an enabling switch to permit operation of the motor at its third speed S, which may be 3600 R. P. M. only when the handle member 34 is in its high position. When the handle member is in its high position and the switch 38 is closed the push button 40 may be depressed and if, at the same time, the handle member 14 is to the left of center, that is, in the second sequence of speeds with the cam roller 20 off the rise 19 and the switch 24 in closed position so that the control relay 3 has been actuated, then the contact 41 will be closed and a circuit will be established to control relay 4 indicated at CR4. The operation of the control relay CR4 will cause the normally closed switch 29 to open and the normally open switch 29b to close, establishing a circuit through the normally closed contacts 42, 43 to the third speed starting relay 44 which will produce actuation of the motor at its third speed of 3600 R. P. M. A light 45 is in the circuit with the push button 40 so that when the motor is operating at its highest speed, i. e., when the handle member 14 is to the left of its center and the handle member 34 is in the high position and the push button 40 has been depressed, the light 45 will be illuminated to warn the operator that he is in the extra high speed range. This extra high speed range gives him three additional higher speeds. There is, of course, no point in operating with the motor in its third position with the handle member 14 to the right of center because the three speeds which would thus be produced would be duplicates of other speeds already provided for.

It will be understood that in Figure 4 I have only shown the control circuit and that the various relays and contacts are in themselves conventional and that holding circuits have been provided as is well known in the art.

According to my present invention the push button 40 is of translucent material and the light 45 is embodied therein so that the push button itself is illuminated when the drive is in its extra high speed range.

It is believed that the further description of details of said earlier patent are unnecessary and that anyone familiar with its teachings will understand how to provide the additional speeds as taught herein.

It will be clear that numerous modifications may be made without departing from the spirit of my invention and I therefore do not intend to limit myself otherwise than as set forth in the claims which follow.

Having now fully described my invention, what I claim as new and desire to secure by Letters Patent is:

1. In a machine tool speed change device, a speed control device at a single location, a plural speed drive, two separate speed change devices, one driving into the other, and each arranged to provide three different speeds, said speed control device having means for operating the elements of the two separate speed change devices selectively, means for effecting selectively a change in speed of said plural speed drive associated with one of said means, enabling means arranged for actuation by the other of said means to permit said plural speed drive to operate at yet another speed, and means for closing a circuit to cause said plural speed drive to operate at said last mentioned speed.

2. In a machine tool speed change device, a driving means capable of operating at speeds $s$, $S$, $\S$, a first speed change device driven thereby and capable of yielding selectively a speed combination A, B, C, a second speed change device driven by said first speed change device and capable of yielding selectively a speed combination X, Y, Z, operating means for said first speed change device settable to select successively the sequences A, B, C, A, B, C, means associated with said operating means for causing said driving means to operate at speed $s$ during the first sequence A, B, C, and at speed $S$ during the second sequence A, B, C, a second operating means for said second speed change device settable to select successively X, Y, Z, means actuated by said second operating means in position Z making possible the operation of said driving means at speed $\S$ when said first operating means is set in the second sequence A, B, C, and separate actuating means for causing said driving means to operate at speed $\S$ when said second operating means is in position Z, and said first operating means is set in said second sequence A, B, C.

3. In combination in a machine tool drive, a gear speed change transmission having a number of speed settings, a drive for the same including a plural speed motor, means for actuating said speed change transmission, an operating lever having a number of positions double that of the number of speed settings and operatively connected to said actuating means to provide said number of speed settings in sequence twice, said motor operating normally at a first speed, means associated with said operating lever for causing said motor to operate at a second speed, said last named means being operative upon movement of said lever across the midpoint of its range of movement, whereby to provide a different speed for each position of said lever, a second gear speed change transmission having a number of speed settings, and arranged in tandem with said first named speed change transmission, a second lever having a number of positions equal in number to the number of speed settings of said second transmission and operative connections between said second lever and said second transmission to effect changes thereof, whereby a number of different speeds equal to the product of the number of positions of said first and second levers may be achieved by various settings of said two levers, an enabling switch arranged to be actuated by second lever in its highest speed position, and an electric circuit including said enabling switch, a push button switch and said motor, arranged to cause said motor to operate at a third speed when said circuit is closed by actuation of said push button, whereby a number of additional speeds equal to the number of speed settings of said first transmission are obtained.

4. In combination in a machine tool drive, a gear speed change transmission having three speed settings, a drive for the same including a three speed motor, fluid operated means for actuating said speed change transmission, an operating lever having six positions and operatively connected to said fluid operated means to provide said three speed settings in sequence twice, said motor normally operating at a first speed, means associated with said operating lever for causing said motor to operate at a second speed, operative upon movement of said lever from its third to its fourth position, whereby to provide six different speeds for the six positions of said lever, a second gear speed change transmission having three speed settings, and arranged in tandem with said first named speed change transmission, a second lever having three positions and operative connections between said second lever and said second transmission to effect changes thereof, whereby eighteen different speeds may be achieved by various settings of said two levers, an enabling switch arranged to be actuated by said second lever in its high speed position, and an electric circuit including said enabling switch and a push button switch and said motor arranged to cause said motor to operate at a third speed when said circuit is closed by actuation of said push button, whereby three additional high speeds are obtained.

GRAHAM E. MARX.

REFERENCES CITED

The following references are of record in the file of this patent:

UNITED STATES PATENTS

| Number | Name | Date |
| --- | --- | --- |
| 773,950 | Loomis | Nov. 1, 1904 |
| 1,588,004 | Blood | June 8, 1926 |
| 2,105,288 | Linden et al. | Jan. 11, 1938 |
| 2,215,627 | Walter | Sept. 24, 1940 |